(12) United States Patent
Chen et al.

(10) Patent No.: US 9,348,169 B2
(45) Date of Patent: May 24, 2016

(54) BORDER STRUCTURES FOR DISPLAYS (71) Applicant: Apple Inc., Cupertino, CA (US)

(72) Inventors: Cheng Chen, San Jose, CA (US); Bryan W. Posner, La Selva Beach, CA (US); Dinesh C. Mathew, Fremont, CA (US); Jun Qi, Cupertino, CA (US); Victor H. Yin, Cupertino, CA (US); Shih Chang Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 14/444,765

(22) Filed: Jul. 28, 2014

(65) Prior Publication Data
US 2015/0116639 A1  Apr. 30, 2015

Related U.S. Application Data (60) Provisional application No. 61/897,730, filed on Oct. 30, 2013.

(51) Int. Cl.
*G02F 1/1335* (2006.01)
*G02F 1/1333* (2006.01)

(52) U.S. Cl.
CPC .... *G02F 1/133512* (2013.01); *G02F 1/133528* (2013.01); *G02F 2001/133388* (2013.01)

(58) Field of Classification Search
CPC ................................. G02F 1/133528
See application file for complete search history.

(56) References Cited

U.S. PATENT DOCUMENTS

| 8,228,358 | B2 | 7/2012 | Larson et al. |
| 8,755,010 | B2 | 6/2014 | Yang et al. |
| 2006/0158467 | A1 | 7/2006 | Larson et al. |
| 2012/0106063 | A1* | 5/2012 | Mathew ............ G02F 1/133528 361/679.21 |
| 2012/0274611 | A1 | 11/2012 | Seo et al. |
| 2013/0265708 | A1 | 10/2013 | Mathew et al. |

FOREIGN PATENT DOCUMENTS

EP   2690614   1/2014

* cited by examiner

*Primary Examiner* — Phu Vu
(74) *Attorney, Agent, or Firm* — Treyz Law Group, P.C.; G. Victor Treyz; Joseph F. Guihan (57) ABSTRACT

A display may have an active area surrounded by an inactive border area. The inactive border area may be provided with an opaque masking material. The display may be a liquid crystal display having a liquid crystal layer sandwiched between a color filter layer and a thin-film transistor layer. Upper and lower polarizers may be provided above and below the color filter and thin-film transistor layers. The upper polarizer may have a polarized central region that overlaps the active area of the display. The upper polarizer may also have an unpolarized portion in the inactive border area overlapping the opaque masking material. The opaque masking material may alternatively be formed on the underside of a clear polymer substrate that is attached to the display above the upper polarizer or may be incorporated within the layers that make up the upper polarizer.

15 Claims, 12 Drawing Sheets

BORDER STRUCTURES FOR DISPLAYS

This application claims the benefit of provisional patent application No. 61/897,730, filed Oct. 30, 2013, which is hereby incorporated by reference herein in its entirety.

BACKGROUND

This relates generally to electronic devices and, more particularly, to electronic devices with displays.

Electronic devices often include displays. For example, cellular telephones, computers, and televisions have displays.

The center of a display such as a liquid crystal display contains an array of display pixels. This portion of the display, which is sometimes referred to as the active area of the display, is used to display images to a user. Peripheral circuits and other portions of the display that do not display images form a border that surrounds the inactive area. This border is sometimes referred to as the inactive area of the display.

To ensure that a display has an appealing appearance, it is generally desirable to hide internal components such as signal traces and other structures in the inactive area from view by the user. Accordingly, displays are often provided with plastic bezel structures that overlap the internal components in the inactive region. Bezel structures can be bulky and unsightly, so some displays are provided with a black ink border. The black ink border can be printed on the underside of a protective cover glass layer within the inactive area. The black ink border is thinner than a plastic bezel and helps hide internal display components in the inactive area of the display from view by the user.

Use of a display cover layer can introduce undesirable thickness and weight into a display. Some displays therefore dispense of the display cover layer and instead ensure that other display layers such as a color filter layer are sufficiently thick to provide the display with desired structural integrity. Black ink in this type of display may be incorporated under an upper polarizer layer in the inactive area of the display.

This type of arrangement poses challenges due to the presence of the polarizer. The polarizer reduces light transmission by half, resulting in reduced light reflection from the ink in the inactive area. If care is not taken, the border to have an unsightly appearance. For example, a white ink border would have an unsightly gray appearance rather than a desired white appearance.

It would therefore be desirable to be able to provide electronic devices with improved display structures such as improved border masking structures.

SUMMARY

An electronic device may be provided with a display. The display may have an active area surrounded by an inactive border area. The inactive border area may be provided with an opaque masking material such as white ink or other material to hide internal display components from view by a user of the electronic device.

The display may be a liquid crystal display having a liquid crystal layer sandwiched between a color filter layer and a thin-film transistor layer. Upper and lower polarizers may be provided above and below the color filter and thin-film transistor layers. The upper polarizer may have a polarized portion that overlaps the active area of the display. The upper polarizer may also have an unpolarized portion in the inactive border area overlapping the opaque masking material.

If desired, the opaque masking material may be formed on the underside of a clear polymer substrate that is attached to the display above the upper polarizer or may be incorporated within the layers that make up the upper polarizer instead of providing the polarizer with an unpolarized region.

DETAILED DESCRIPTION

An electronic device may be provided with a display. The display may have an active area and an inactive area. The active area may have a rectangular array of display pixels that produce images for viewing by a user. The inactive area may have the shape of a rectangular ring that surrounds the active area and that serves as a border for the display. An opaque masking structure may be used to provide the border with a desired appearance. The opaque masking structure may include a layer of material such as plastic with light scattering bubbles, dye, pigment, ink, paint, metal, or other materials that are sufficiently opaque to prevent a user from viewing internal display structures in the inactive area. The opaque masking structure may include dye, pigment, or other structures that impart a desired color or other visible characteristics to the border when viewed from the exterior of the display.

The inactive area of the display may, as an example, be provided with opaque masking structures that are formed from white ink (i.e., a liquid polymer containing light scattering particles such as titanium oxide particles or other material that cause the polymer to have a white appearance) Inks of other colors and other opaque masking materials may also be used if desired (e.g., black ink, gray ink, silver ink, gold ink, red ink, blue ink, green ink, ink of different colors, polymers with light scattering features such as bubbles, metal, etc.). The use of white opaque masking structures such as white ink in forming opaque masking structures for the inactive area of a display is sometimes described herein as an example.

Illustrative electronic devices that have housings that accommodate displays are shown in FIGS. 1, 2, 3, and 4.

Figure 1:
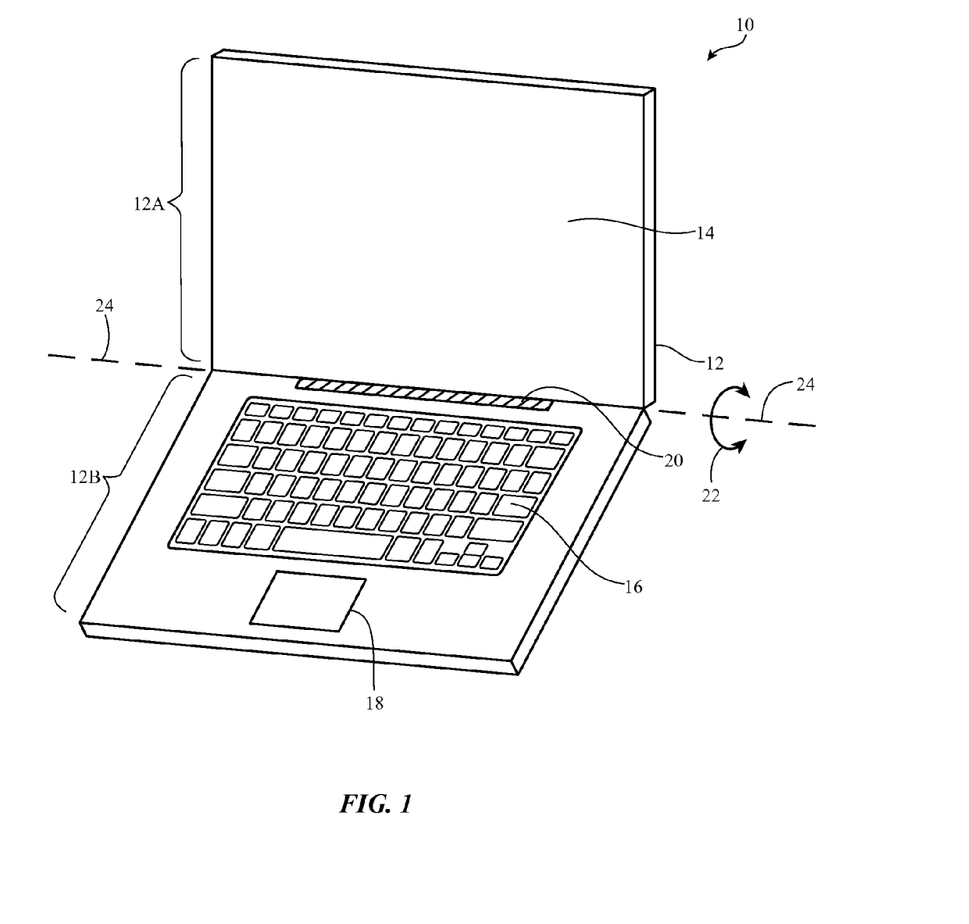
FIG. 1 is a perspective view of an illustrative electronic device such as a laptop computer with display structures in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes referred to as a display housing or lid, is placed in a closed position by rotating upper housing 12A towards lower housing 12B about rotational axis 24.

Figure 2:
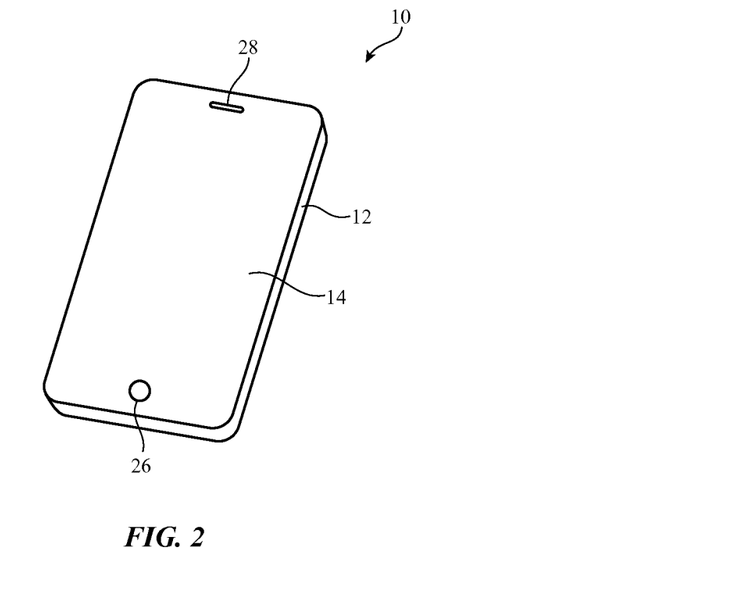
FIG. 2 is a perspective view of an illustrative electronic device such as a handheld electronic device with display structures in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
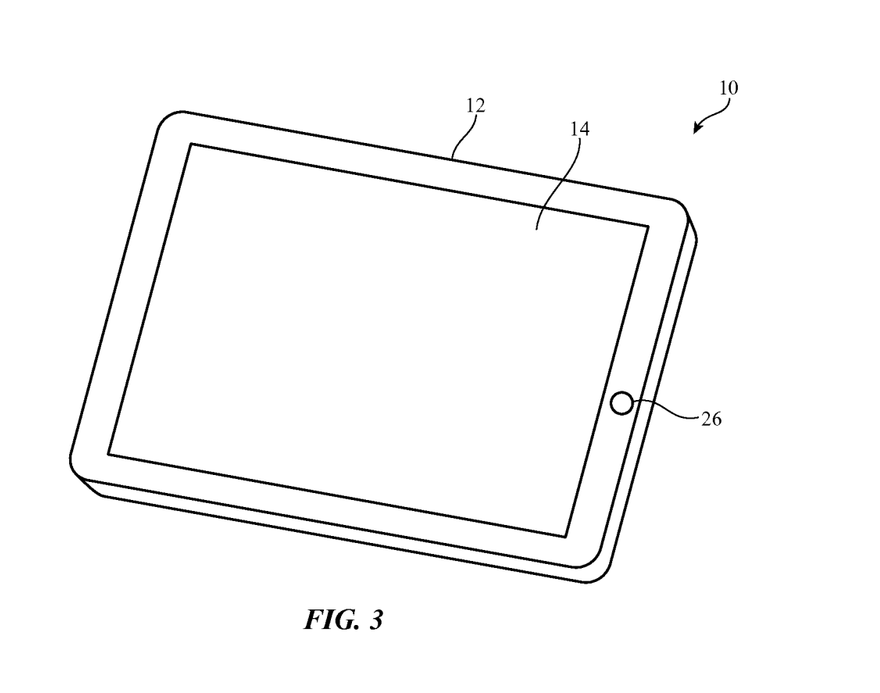
FIG. 3 is a perspective view of an illustrative electronic device such as a tablet computer with display structures in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an external layer with an opening to accommodate button 26.

Figure 4:
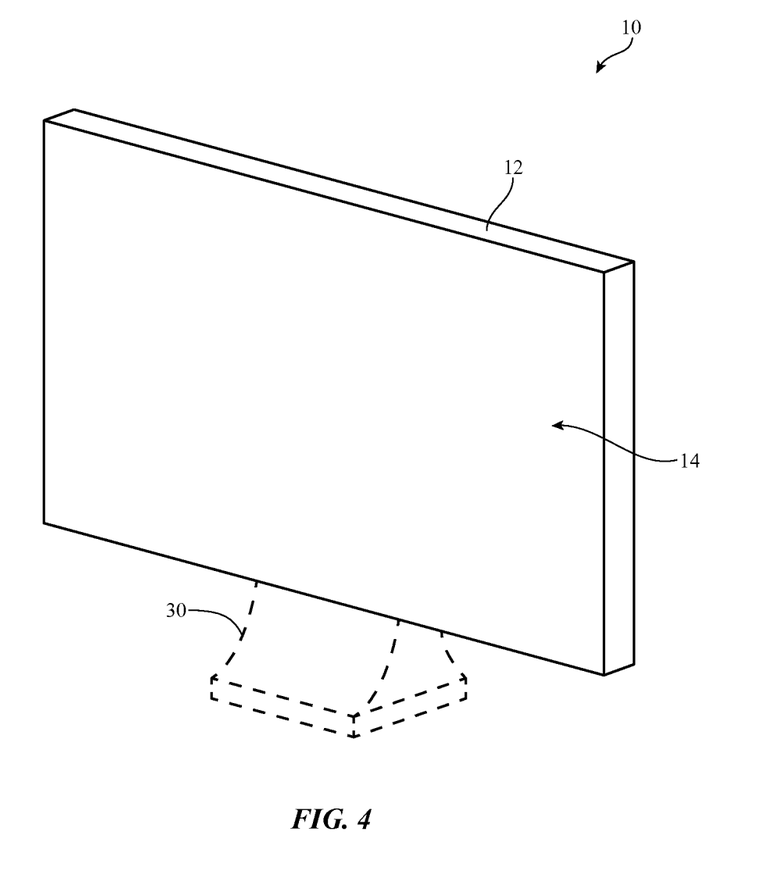
FIG. 4 is a perspective view of an illustrative electronic device such as a display for a computer or television with display structures in accordance with an embodiment.

FIG. 4 shows an illustrative configuration for electronic device 10 in which device 10 is a computer display, a computer that has an integrated computer display, or a television. Display 14 is mounted on a front face of housing 12. With this type of arrangement, housing 12 for device 10 may be mounted on a wall or may have an optional structure such as support stand 30 to support device 10 on a flat surface such as a table top or desk.

Display 14 may be a liquid crystal display or a display formed using other display technologies (e.g., a plasma display, an organic light-emitting diode display, an electrophoretic display, an electrowetting display, a hybrid display that incorporates multiple display types into a single display structure, etc.). Liquid crystal display structures for forming display 14 are sometimes described herein as an example.

Figure 5:
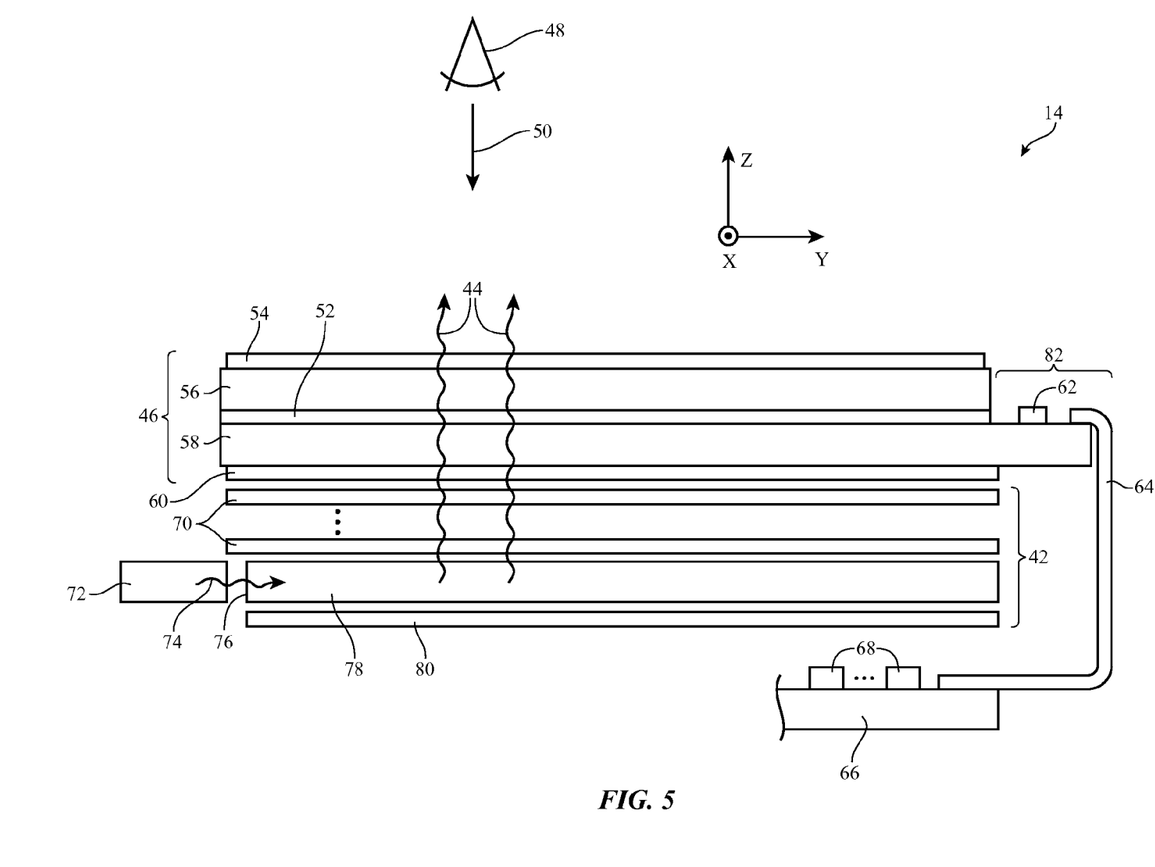
FIG. 5 is a cross-sectional side view of a liquid crystal display in accordance with an embodiment.

A cross-sectional side view of an illustrative configuration that may be used for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer by forming transistor circuits on a glass layer and to form a color filter layer may patterning color filter elements on a glass layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, the positions of color filter layer 56 and thin-film-transistor layer 58 may be inverted so that the thin-film-transistor layer is located above the color filter layer.

During operation of display 14 in device 10, control circuitry (e.g., one or more integrated circuits such as components 68 on printed circuit 66 of FIG. 5) may be used to generate information to be displayed on display 14 (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 60. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. If desired, optical films may be incorporated into other layers of display 14. For example, compensation films may be incorporated into polarizer 54 (as an example).

Figure 6:
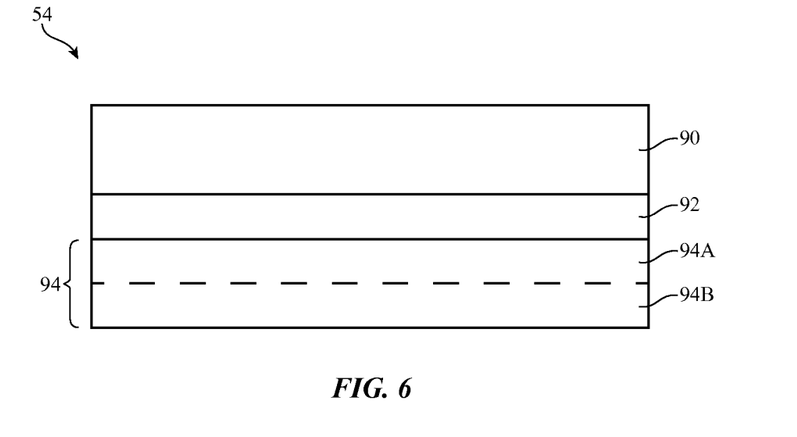
FIG. 6 is a cross-sectional side view of a polarizer in accordance with an embodiment.

Polarizers such as upper (outer) polarizer 54 and lower (inner) polarizer 60 may be formed from multiple layers of material that are laminated together. An illustrative laminated polarizer is shown in the cross-sectional side view of FIG. 6. As shown in FIG. 6, polarizer 54 (i.e., an upper polarizer in this example) may have polarizer film (layer) 92. Film 92 may be formed from a stretched polymer such as stretched polyvinyl alcohol (PVA) and may therefore sometimes be referred to as a PVA layer. Iodine may be placed on to the stretched PVA film so that iodine molecules align with the stretched film and form the polarizer. Other polarizer films may be used if desired. Polarizer film 92 may be sandwiched between layers 90 and 94. Layers 90 and 94 may be formed from clear polymers. For example, layer 90 may be formed from a material such as tri-acetyl cellulose (TAC) and may sometimes be referred to as a TAC film. The TAC film or other supporting substrate may help support and protect the PVA film. Other films may be laminated to film 92 if desired. For example, lower film(s) 94 may be formed from one or more compensation films 94A and 94B (i.e., birefringent films that help enhance off-axis viewing performance for display 14). Adhesive layers may be used to hold laminated films together.

Figure 7:
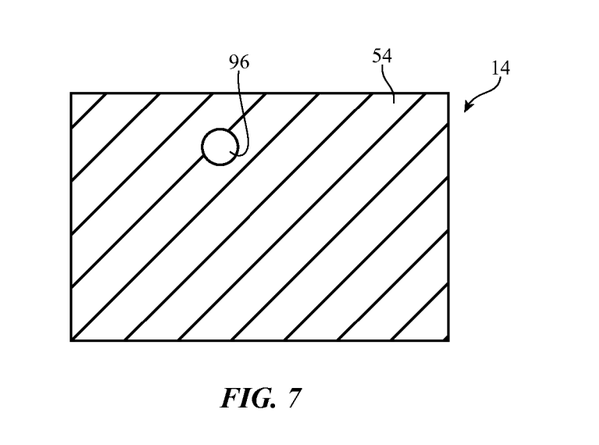
FIG. 7 is a top view of a display having a polarizer with a circular unpolarized region in accordance with an embodiment.

The presence of polarizer material over the entire surface of display 14 may create challenges in forming desired border regions and in mounting components behind display 14. For example, it may be desirable to mount components such as a camera, ambient light sensor, light-based proximity sensor, or other light-based components under a portion of the upper polarizer in display 14. This allows the components to be hidden from view while receiving light through the surface of display 14. In the presence of polarizer material, light transmittance is cut in half. The reduced amount of light that would reach a camera, light sensor, or other light-based component in this type of arrangement would tend to decrease component performance (e.g., low-light camera and sensor performance would be degraded). This challenge can be addressed by forming an unpolarized area in polarizer 54 such as illustrative circular unpolarized area 96 of FIG. 7. The unpolarized area may be used in forming a light window such as a camera window or light sensor window in display 14 that is not subject to transmission losses due to polarizer material.

Figure 8:
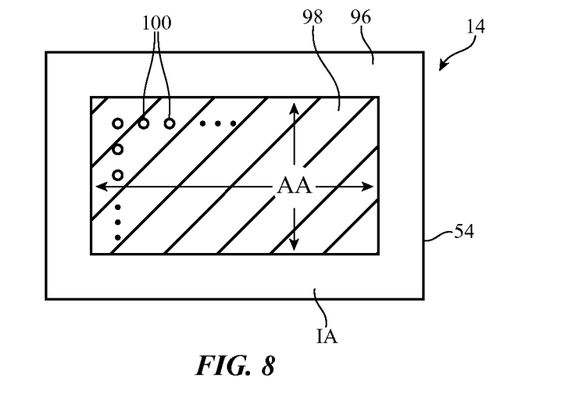
FIG. 8 is a top view of a display having a polarizer with a rectangular ring-shaped unpolarized region that runs along the rectangular periphery of the display and that serves as part of the border of the display in accordance with an embodiment.

The presence of polarizer material around the edge of display 14 may affect the appearance of the border of display 14, because reduced light transmittance can affect the appearance of underlying opaque masking material. As an example, when an opaque masking material such as white ink is used to form the border for display 14, the presence of overlapping polarizer material may case the white ink to have an undesirable gray appearance. To ensure that the border of display 14 has a desired appearance, polarizer 54 can be provided with a central rectangular polarized portion 98 surrounded by an unpolarized border such as border 96 that overlaps the opaque masking material, as shown in FIG. 8. Other unpolarized areas may be provided within polarizer 54 if desired. The examples in which polarizer 54 has been provided with a circular unpolarized region (unpolarized region 96 of FIG. 7) and rectangular ring-shaped unpolarized region (unpolarized region 96 of FIG. 8) are merely illustrative.

With one suitable technique, polarizer 54 may be laser-bleached to change the chemical properties of the polarizer (i.e., to disrupt the iodine on the PVA layer) and thereby create an unpolarized layer. Chemical treatment of polarizer 54 (e.g., with a strong base such as KOH) or other techniques may also be used to form patterned unpolarized regions within polarizer 54.

In a typical display configuration, display 14 may be provided with a rectangular array of display pixels that provide images for a user (see, e.g., display pixels 100 in FIG. 8). This rectangular portion of display 14 is sometimes referred to as the active area AA of display 14. An inactive border region, sometimes referred to as inactive area IA, may run along some or all of the peripheral edges of the active area AA. For example, display 14 may have an inactive area IA that has the shape of a rectangular ring and that forms a border running along all four sides of a central rectangular active area AA, as shown by inactive border area IA in FIG. 8.

To hide signal traces and other internal device structures from view by a user, inactive area IA may be provided with an opaque masking layer such as a layer of white ink or other opaque material. Particularly in scenarios in which the opaque masking material has a color that would be degraded by the presence of overlapping polarizer, it may be desirable to form unpolarized regions such as unpolarized border 96 in inactive area IA of FIG. 8 or to otherwise provide display 14 with a configuration that avoids placement of polarizer material on top of the opaque masking material.

Figure 9:
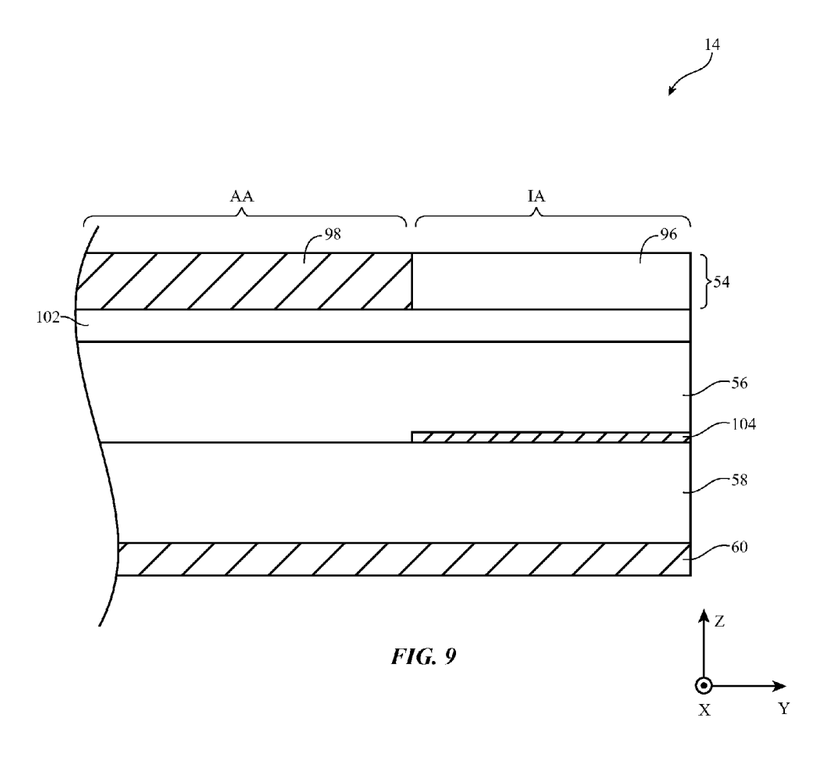
FIG. 9 is a cross-sectional side view of an illustrative display showing how an opaque masking layer may be provided between display layers such as a color filter layer and thin-film transistor layer in a liquid crystal display and may be overlapped by an unpolarized border region in a polarizer layer in accordance with an embodiment.

Consider, as an example, the configuration of FIG. 9. In this type of arrangement, polarizer 54 has been provided with a polarized region 98 that overlaps active area AA of display 14 and an unpolarized border region 96 that lies within the inactive area IA along the border of display 14 (e.g., a rectangular border of the type shown in FIG. 8). Opaque masking material 104 may be located at an internal position within the layers of display 14. As an example, layer 104 may be formed on the underside of layer 56 or on the upper surface of layer 58 in inactive area IA. (Liquid crystal material 52 may be located between layers 56 and 58 in active area AA.) Adhesive 102 may be used to attach polarizer 54 to layer 56. Opaque masking material 104 may be a layer of white ink or other white opaque masking material (as an example). Because the portion of polarizer 54 that overlaps opaque masking material 104 in inactive area IA is unpolarized, the transmittance of polarizer 54 in inactive area IA is high. The appearance of opaque masking material 104 to a user of display 14 will therefore be satisfactory (e.g., white border material will appear as an attractive shade of white rather than gray).

Figure 10:
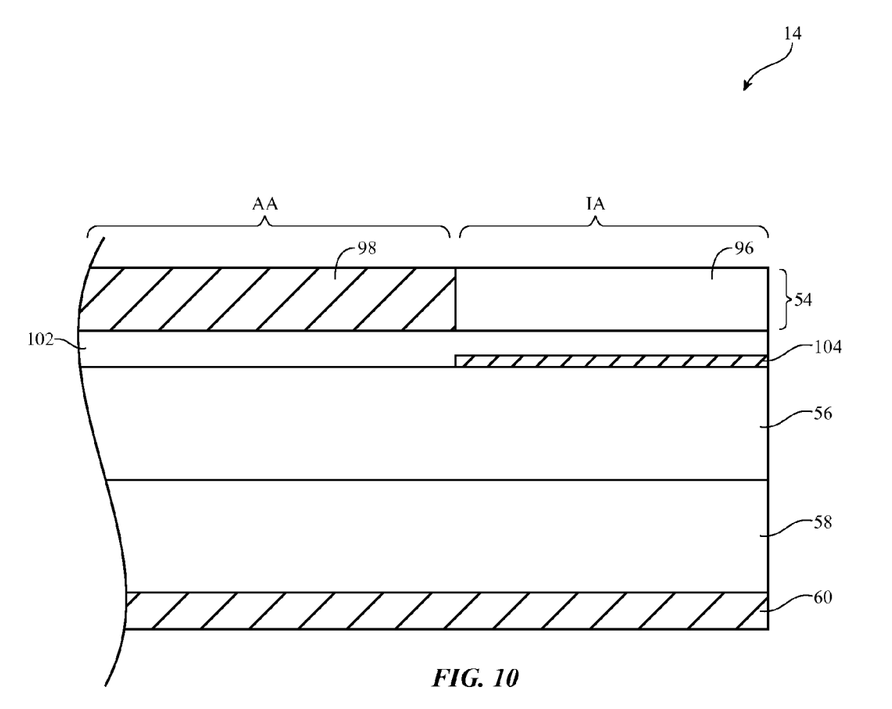
FIG. 10 is a cross-sectional side view of an illustrative display showing how an opaque masking layer in an inactive border region may be provided on top of display layers such as a color filter layer and thin-film transistor layer in a liquid crystal display and may be overlapped by an unpolarized border region in a polarizer layer in accordance with an embodiment.

FIG. 10 is a cross-sectional side view of a portion of display 14 in an illustrative configuration in which opaque masking material 104 (e.g., a layer of white ink or other white opaque masking material) has been formed on the upper surface of layer 56. Adhesive 102 may be a liquid adhesive such as optically clear adhesive or a pressure sensitive adhesive that is able to accommodate surface-height variations. This may help avoid creating undesirable surface features on polarizer 54 due to the thickness of underlying opaque masking material 104. As with the illustrative arrangement of FIG. 9, unpolarized portion 96 of polarizer 54 in display 14 of FIG. 10 may be laterally aligned with opaque masking material 104 to enhance the visibility of opaque masking material 104.

Figure 11:
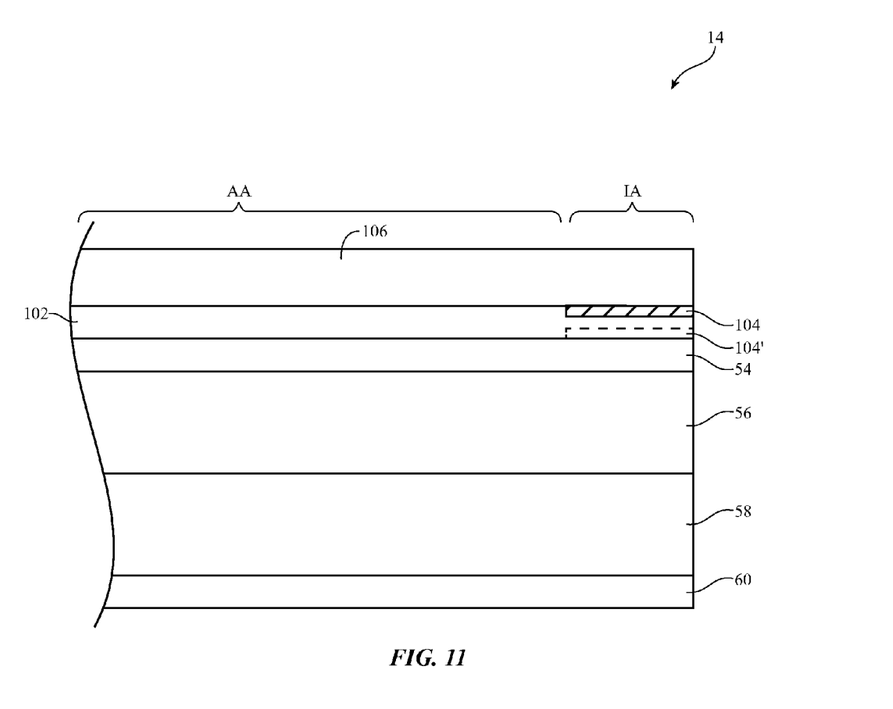
FIG. 11 is a cross-sectional side view of an illustrative display showing how an opaque masking layer may be provided on the underside of a clear substrate layer that is incorporated into a liquid crystal display on top of a polarizer and other display layers in accordance with an embodiment.

If desired, a clear polymer layer or other substrate material may be used as a carrier for opaque masking material 104. As shown in FIG. 11, for example, transparent substrate material 106 may be attached to display 14 above upper polarizer 54. Transparent substrate material 106 may be, for example, a sheet of a flexible polymer such as triacetate cellulose, acrylic, polyethyleneterephthalate (PET), etc. Opaque masking material 104 (e.g., white ink or other white opaque masking material) may be formed in inactive area IA. Opaque masking material 104 may be located on the lower surface of substrate 106. Liquid adhesive such as optically clear adhesive 102 or other adhesive may be used to attach substrate 106 to the upper surface of upper polarizer 54. The opposing lower surface of upper polarizer 54 may be attached to layer 56. The use of adhesive 102 to attach substrate 106 may help avoid creating undesirable surface features on the exposed surface of substrate 106 due to the thickness of underlying opaque masking material 104. Unlike polarized material, portion 106' of transparent substrate layer 106 has a high (near 100%) transmittance, so that opaque masking material 104 may have a desired appearance (e.g., a white appearance rather than a gray appearance in situations in which material 104 is formed form a white ink or other white opaque masking material).

If desired, the outermost layer of display 14 (e.g., layer 106 in the example of FIG. 11) may be provided with materials and/or sublayers that integrate desired functionality into the outermost layer. As an example, layer 106 may be provided with coatings and/or integral materials so that layer 106 exhibits antireflection properties, antiglare properties, anti-smudge properties, scratch resistance, etc.

As indicated by illustrative opaque masking material 104', the opaque masking material (e.g., white ink or other white opaque masking material) may, if desired, be formed on the upper surface of polarizer 54, rather than on the underside of substrate 106.

Figure 12:
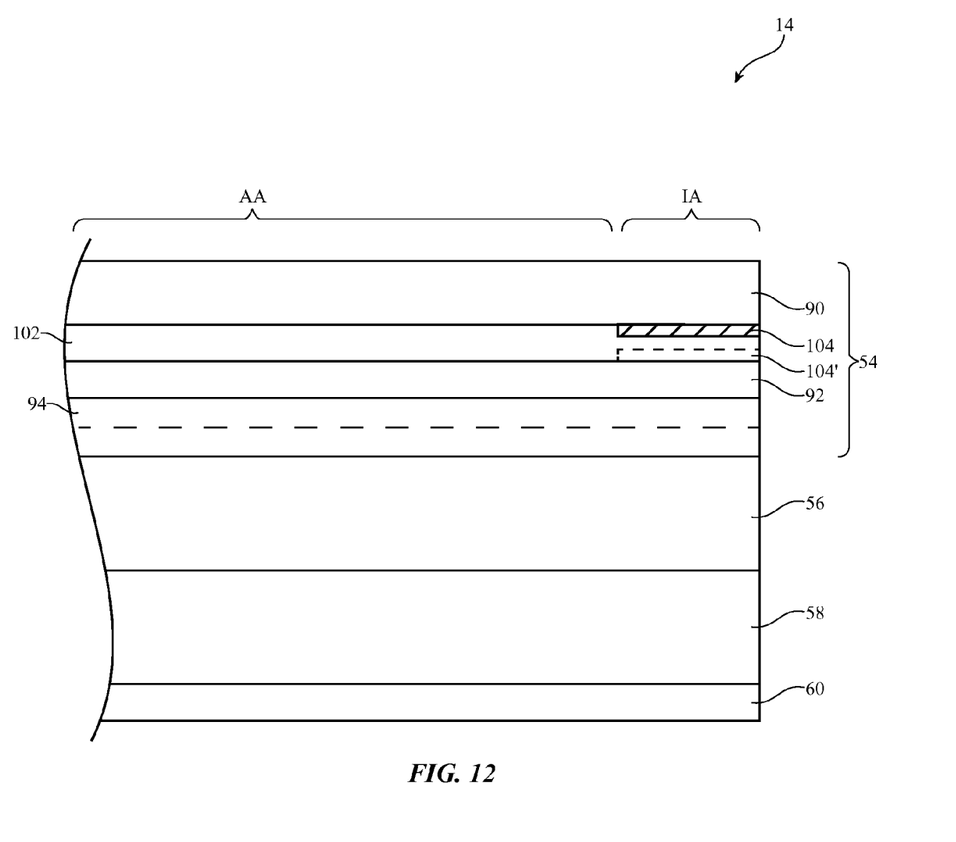
FIG. 12 is a cross-sectional side view of an illustrative display showing how an opaque masking layer may be provided on a layer within a polarizer in a liquid crystal display in accordance with an embodiment.

FIG. 12 shows how opaque masking material 104 may be incorporated into display 14 as one of the internal layers of polarizer 54. In the illustrative configuration of FIG. 12, opaque masking material 104 has been formed on the underside of polarizer layer 90 (e.g., a TAC layer or other clear polymer layer). Adhesive 102 (e.g., pressure sensitive adhesive, liquid adhesive, etc.) may be used in attaching layer 90 to polarizer layer 92 (e.g., a polyvinyl alcohol layer). Compensation layer(s) 94 or other clear polymer layer(s) may be attached to the underside of layer 92. Polarizer 54 may be attached to display layers 56 and 58 and lower polarizer 60 to form display 14. If desired, opaque masking layer 104 may be formed on the upper surface of layer 92, as indicated by illustrative opaque masking layer 104'. The opaque masking layer may also be formed on other sublayers in polarizer 54 (e.g., layer 104 may be formed on other surfaces of layer 92 and/or layers 94 under an unpolarized portion of polarizer 54).

Figure 13:
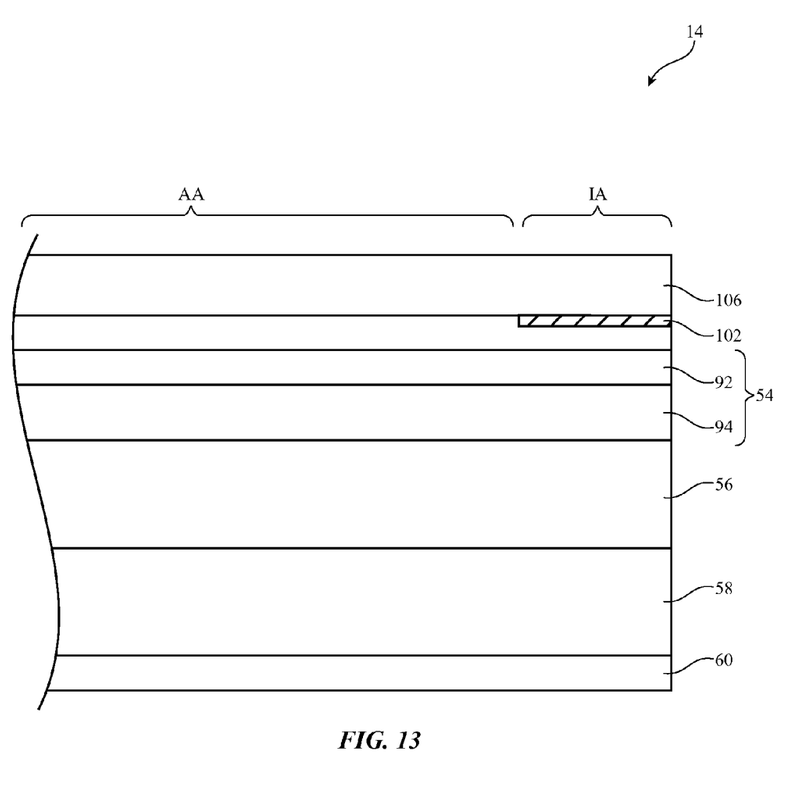
FIG. 13 is a cross-sectional side view of an illustrative display showing how an opaque masking layer may be provided on the underside of a clear substrate layer that is incorporated into a liquid crystal display on top of a polarizer with single sided support in accordance with an embodiment.

FIG. 13 shows how polarizer 54 may be implemented using a single-sided support structure (i.e., using only a single support layer such as support layer 94 to support polyvinyl alcohol layer 92). This type of polarizer 54 may be used in displays of the type shown in FIGS. 9, 10, 11, and 12, if desired.

Figure 14:
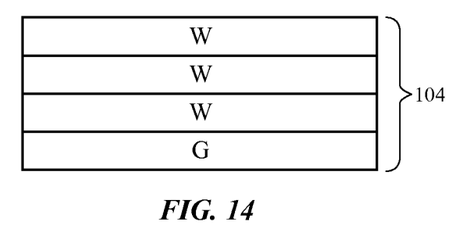
FIGS. 14 and 15 are cross-sectional side views of illustrative opaque masking layers that may be provided in inactive areas of a display in accordance with an embodiment.
Figure 15:
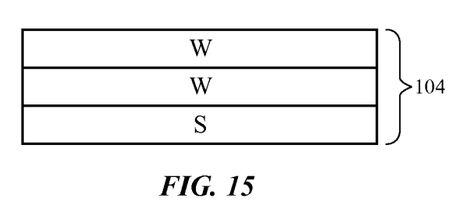

FIGS. 14 and 15 are cross-sectional side views of illustrative opaque masking layers that may be provided in inactive areas of display 14.

In the illustrative configuration of FIG. 14, opaque masking material 104 has been formed from multiple white layers W (e.g., two or more white layers, three or more white layers, or four or more white layers) on top of a non-white layer such as gray layer G. Inks or other opaque masking materials may be used in forming the layers of FIG. 14.

In the illustrative configuration of FIG. 15, opaque masking material 102 has been formed from multiple white layers W (e.g., two or more white layers, three or more white layers, or four or more white layers) on top of a non-white layer such as metal layer S. Inks or other opaque masking materials may be used in forming the white layers of FIG. 14. A metal such as silver or aluminum or other metals may be used in forming metal layer S.

Layer 102 may have a thickness in the range of 2 to 60 microns, a thickness in the range of 4 to 20 microns, a thickness of 5 to 30 microns, or other suitable thickness. As an example, a four layer structure of the type shown in FIG. 14 may have a thickness of about 20-25 microns, whereas a three layer structure of the type shown in FIG. 15 may have a thickness of about 6-10 microns (as examples). The use of thinner layers helps to avoid visible bumps on display 14 at the interface between active area AA and inactive area IA. Conformal layers such as liquid adhesive layers, pressure sensitive adhesive layers, and layers of other material that can flow to accommodate the locally enhanced thickness from layer 102 may be incorporated into display 14 to help reduce visible thickness discontinuities.

Ink, metal, and other opaque masking materials may be deposited and patterned using roll-to-roll screen printing techniques, gravure printing using a patterned drum feed by an inked roller, or photolithographic techniques such as lift-off masking techniques may be used in patterning opaque masking material 102.

The foregoing is merely illustrative and various modifications can be made by those skilled in the art without departing from the scope and spirit of the described embodiments. The foregoing embodiments may be implemented individually or in any combination.

What is claimed is:

1. A display having an active area completely surrounded by an inactive border area, comprising:
   a plurality of layers;
   an opaque masking material on one of the plurality of layers in the inactive border area; and
   a polarizer on the plurality of layers, wherein the polarizer has a polarized portion in the active area and has an unpolarized portion in the inactive border area that overlaps the opaque masking material, wherein the unpolarized portion includes every portion of the polarizer that is in the inactive border area.

2. The display defined in claim 1 wherein the plurality of layers comprises a color filter layer and wherein the opaque masking material comprises opaque masking material on the color filter layer.

3. The display defined in claim 2 wherein the color filter layer has opposing upper and lower surfaces, the display further comprising:
   a thin-film transistor layer; and
   a liquid crystal layer between the lower surface of the color filter layer and the thin-film transistor layer, wherein the opaque masking material is formed on the upper surface of the color filter layer.

4. The display defined in claim 3 wherein the opaque masking material comprises white material.

5. The display defined in claim 2 wherein the color filter layer has opposing upper and lower surfaces, the display further comprising:
   a thin-film transistor layer; and
   a liquid crystal layer between the color filter layer and the thin-film transistor layer in the active area, wherein the opaque masking material is formed in the inactive border area between the lower surface of the color filter layer and the thin-film transistor layer.

6. The display defined in claim 5 wherein the opaque masking material comprises white material.

7. A display having an active area surrounded at least partly by an inactive border area, comprising:
   a polarizer layer having an upper surface;
   a clear substrate layer;
   an opaque masking material on the clear substrate layer, wherein the opaque masking material comprises a plurality of white ink layers on a non-white opaque layer; and
   adhesive that attaches the clear substrate layer to the polarizer layer so that the opaque masking layer is in the inactive border area.

8. The display defined in claim 7 further comprising:
   a color filter layer;
   a thin-film transistor layer; and
   a liquid crystal layer between the color filter layer and the thin-film transistor layer, wherein the polarizer has a lower surface that is attached to the color filter layer and has an upper surface to which the clear substrate is attached with the adhesive.

9. The display defined in claim 8 wherein the clear substrate layer comprises a transparent polymer layer.

10. The display defined in claim 9 wherein the adhesive comprises liquid adhesive.

11. The display defined in claim 7 wherein the non-white opaque layer comprises gray ink.

12. The display defined in claim 7 wherein the non-white opaque layer comprises metal.

13. A display having an active area surrounded at least partly by an inactive border area, the display comprising:
   display layers including a color filter layer, a thin-film transistor layer, and a liquid crystal layer between the color filter layer and the thin-film transistor layer;
   a polarizer on the display layers, wherein the polarizer comprises a polyvinyl alcohol layer and a tri-acetyl cellulose layer; and
   an opaque masking material in the inactive border area, wherein the opaque masking material is between the polyvinyl alcohol layer and the tri-acetyl cellulose layer.

14. The display defined in claim 13 wherein the opaque masking layer comprises a white material.

15. The display defined in claim 14 wherein the white material comprises white ink.

* * * * *